UNITED STATES PATENT OFFICE.

JAMS W. B. TURK, OF EUCHEE, TENNESSEE.

IMPROVEMENT IN MEDICAL COMPOUNDS.

Specification forming part of Letters Patent No. 210,477, dated December 3, 1878; application filed April 20, 1878.

*To all whom it may concern:*

Be it known that I, JAMS W. B. TURK, of Euchee, in the county of Meigs and State of Tennessee, have invented a new and useful Improvement in Medical Compounds, of which the following is a specification:

The object of this invention is to furnish an improved medical compound for the cure of fever and ague and other malarial diseases.

The invention consists in the compound formed of red-physic root, or *Gallinia trifoliata*, white John root, (*Gentiana ochroleuca*,) and dog-wood root, (*Cornus Florida*,) in the proportions and manner hereinafter fully described.

In preparing this compound I take the roots in the proportions of four pounds of the root of the red physic, sometimes called "red Indian physic," one pound of the root of the white John, sometimes called "Indian John," and also "Sampson snake-root," and one pound of the root of the dog-wood. These roots are bruised, and then macerated in sufficient warm or boiling water to form a strong decoction. To the decoction thus formed is then added a sufficient quantity of alcohol to preserve it and keep it from souring. The compound is then bottled for use or market.

The quantity of water used with the roots above specified may be about a pint and a half, more or less.

In the case of adults, a table-spoon, and in that of children under twelve years of age a tea-spoon, may be employed to measure the dose, which is to be taken preferably in the morning and evening.

Having thus described my invention, I claim as new and desire to secure by Letters Patent—

A medical compound formed from the roots of the red physic, the white John, and the dog-wood, in the proportions and manner substantially as herein set forth and described.

JAMS W. B. TURK.

Witnesses:
    G. M. BLACK,
    JNO. H. ROWDEN.